United States Patent
Kähkönen

(10) Patent No.: US 9,257,844 B2
(45) Date of Patent: Feb. 9, 2016

(54) ARRANGEMENT AND METHOD FOR REACTIVE POWER COMPENSATION

(75) Inventor: Antero Kähkönen, Rauma (FI)

(73) Assignee: ALSTOM Grid Oy, Tampere (FI)

( * ) Notice: Subject to any disclaimer, the term of this patent is extended or adjusted under 35 U.S.C. 154(b) by 21 days.

(21) Appl. No.: 13/637,094

(22) PCT Filed: Apr. 12, 2011

(86) PCT No.: PCT/FI2011/050317
§ 371 (c)(1),
(2), (4) Date: Sep. 25, 2012

(87) PCT Pub. No.: WO2011/128508
PCT Pub. Date: Oct. 20, 2011

(65) Prior Publication Data
US 2013/0009615 A1    Jan. 10, 2013

(30) Foreign Application Priority Data
Apr. 14, 2010  (FI) ..................................... 20105389

(51) Int. Cl.
*G05F 1/70* (2006.01)
*H02J 3/18* (2006.01)
*H02M 7/00* (2006.01)

(52) U.S. Cl.
CPC ................. *H02J 3/1864* (2013.01); *G05F 1/70* (2013.01); *H02M 7/003* (2013.01); *Y02E 40/12* (2013.01)

(58) Field of Classification Search
CPC ............. G05F 1/70; G05F 3/06; H02M 7/003
USPC .................................................. 323/208, 210
See application file for complete search history.

(56) References Cited

U.S. PATENT DOCUMENTS

| 3,731,183 A | 5/1973 | Johnson et al. |
| 4,555,658 A | 11/1985 | Häusler et al. |
| 5,672,956 A | 9/1997 | Fukui et al. |

(Continued)

FOREIGN PATENT DOCUMENTS

| CN | 2533603 Y | 1/2003 |
| EP | 0180 231 | 5/1986 |

(Continued)

OTHER PUBLICATIONS

L.J. Bohmann et al. "Harmonic Interactions in Thyristor Controlled Reactor Circuits". IEEE Transactions on Power Delivery, vol. 4, No. 3, Jul. 1989. pp. 1919-1926.*
Finnish Office Action dated Oct. 15, 2010. 4 pages.
Finnish Search Report dated Oct. 14, 2010. 1 page.
Extended European Search Report for Application No. EP 11768511 dated Jun. 18, 2015.

(Continued)

*Primary Examiner* — Gary L. Laxton
*Assistant Examiner* — Kevin H Sprenger
(74) *Attorney, Agent, or Firm* — Morgan, Lewis & Bockius LLP

(57) ABSTRACT

An arrangement and a method for reactive power compensation in connection with a power transmission line. The arrangement includes at least one transformer and at least one reactive power compensator connected to the low-voltage side of the transformer and at least one adapter reactor, the adapter reactor being connected in series with the transformer so that the reactive power compensator is connected to the power transmission line via the transformer and the adapter reactor.

6 Claims, 1 Drawing Sheet

(56) References Cited

U.S. PATENT DOCUMENTS

| | | | |
|---|---|---|---|
| 5,969,509 A | 10/1999 | Thorvaldsson | |
| 7,446,511 B2* | 11/2008 | Wu et al. | 323/207 |
| 7,688,043 B2* | 3/2010 | Toki et al. | 323/210 |
| 7,692,415 B2* | 4/2010 | Yasuda et al. | 323/210 |
| 2010/0033028 A1 | 2/2010 | Sadek et al. | |
| 2010/0066317 A1 | 3/2010 | Angquist et al. | |
| 2012/0139506 A1* | 6/2012 | Matsuda et al. | 323/210 |

FOREIGN PATENT DOCUMENTS

| | | |
|---|---|---|
| GB | 2 273 615 A | 6/1994 |
| JP | 10-260744 | 9/1998 |

OTHER PUBLICATIONS

Third Party Observation (with English Translation) in European Patent Application No. 2559129, dated Feb. 20, 2013.

A. Kazemi et al., "A dynamically SVC based compact control algorithm for load balancing in distribution systems," International Journal of Energy, Issue 3, vol. 1, 2007, pp. 72-76.

L. S. Czarnecki et al. "Thyristor controlled susceptances for balancing compensators operated under nonsinusoidal conditions," IEE Proc-Electr. Power Appl., vol. 141, No. 4, Jul. 1994, pp. 177-185.

A. Kazemi et al., "A SVC Based Control Algorithm for Load Balancing," Proceedings of the 7th WSEAS International Conference on Power Systems, Beijing, China, Sep. 15-17, 2007, pp. 201-205.

* cited by examiner

ARRANGEMENT AND METHOD FOR REACTIVE POWER COMPENSATION

BACKGROUND OF THE INVENTION

The invention relates to an arrangement for reactive power compensation in connection with a power transmission line, the arrangement comprising at least one transformer and at least one reactive power compensator connected to the low-voltage side of the transformer.

The invention further relates to a method for reactive power compensation in connection with a power transmission line, the method comprising compensating for reactive power by means of a reactive power compensator connected to the low-voltage side of at least one transformer.

FIG. 1 shows a prior art arrangement for reactive power compensation in connection with a power transmission line schematically. For the sake of clarity, FIG. 1 shows only one phase, such as phase A, of the power transmission line 1. FIG. 1 also shows a transformer 2 or a main transformer 2, via which the voltage level of the power transmission line 1 can be reduced. On the high-voltage or primary side, the transformer 2 is connected to the power transmission line 1 by a schematically shown connection at a connection point CP1. The arrangement of FIG. 1 also includes, connected to the low-voltage or secondary side of the transformer 2, a voltage busbar 3, of which only one phase, i.e. phase A, is shown schematically. The low-voltage side of the transformer 2 is connected to the voltage busbar 3 by a schematically shown connection at a connection point CP2. The voltage busbar 3 is further connected with a static reactive power compensator 4, which, in the embodiment shown in FIG. 1, comprises a thyristor-controlled reactor (TCR) 5 shown schematically by a triangular symbol and three harmonic filters 6, i.e. filters of harmonic frequencies. The thyristor-controlled reactor 5 comprises a coil and a thyristor switch controlling it, which thyristor switch may comprise up to tens of thyristor levels connected in series and consisting of antiparallel-connected thyristor pairs. The harmonic filter 6, for its part, consists of a coil L and a capacitor C that are dimensioned in a suitable manner and connected in series with one another. The arrangement of FIG. 1 may further comprise an auxiliary transformer 7 connected to the voltage busbar 3 and providing at a substation, where the arrangement of FIG. 1 may possibly be located, a voltage source, which is possibly required by the devices of the substation. By way of example it may be assumed that the power transmission line 1 forms part of the 220 kV high-voltage network, for example, and the voltage busbar 3 forms part of the 20 kV medium-voltage network, for example. In this case, the transformer 2 may be dimensioned, for instance, in such a manner that the power of the transformer 2 may be 150 MVA and reactance 12%, for example.

The arrangement for reactive power compensation in connection with a power transmission line, like the one in FIG. 1, has many different disadvantages. One disadvantage is voltage variation at the voltage busbar 3, which is caused by inductive or capacitive current passing through the transformer reactance. As a result, the voltage of auxiliary electric power supplied by the auxiliary transformer 7 for the substation devices may also vary significantly and cause disturbance in the devices or even break devices. Furthermore, depending on the connection of the reactive power compensator 4 connected to the voltage busbar 3, reactive power effective at the voltage busbar 3 may vary from a value of 150 MVAr of capacitive reactive power to a value of 150 MVAr of inductive reactive power, for instance. To implement a reactive power compensator 4 having such a high power causes significant costs because of the structure and components of the reactive power compensator 4 as well as the installation thereof at the application site. Furthermore, since the aim is to have as low impedance of the transformer 2 as possible to limit the voltage increase induced by capacity current and to lower the transformer price, the result is that, in practice, the transformer 2 cannot limit the short-circuit current and that harmonic overvoltages can easily pass through the transformer 2, which increases the number of the required harmonic filters 6.

BRIEF DESCRIPTION OF THE INVENTION

It is an object of the present invention to provide a novel and improved arrangement for reactive power compensation in connection with a power transmission line.

The arrangement of the invention is characterized in that the arrangement further comprises at least one adapter reactor, which is connected in series with the transformer so that the reactive power compensator is connected to the power transmission line via the transformer and the adapter reactor.

The method of the invention is characterized by connecting at least one adapter reactor in series with the transformer so that the reactive power compensator is connected to the power transmission line via the transformer and the adapter reactor.

The arrangement for reactive power compensation in connection with a power transmission line comprises at least one transformer and at least one reactive power compensator connected to the low-voltage side of the transformer. The arrangement further comprises at least one adapter reactor, which is connected in series with the transformer so that the reactive power compensator is connected to the power transmission line via the transformer and the adapter reactor.

By connecting the adapter reactor in series with the transformer such that the reactive power compensator is connected to the power transmission line via the transformer and the adapter reactor, the efficiency of the reactive power compensation can be improved considerably in the system. As a result, the structure of the reactive power compensator can be simplified and the number of components required in the reactive power compensator decreases, which, among other things, makes the losses in the reactive power compensator smaller and reduces the installation work required for installing the reactive power compensator at its application site.

According to an embodiment, the adapter reactor is connected to the low-voltage side of the transformer between the transformer and the reactive power compensator. An advantage of this solution is, for example, that it is thus easy to provide, if necessary, the auxiliary transformer, by which a voltage source can be provided for devices at a substation or in connection therewith, with a connection point in such a manner that voltage variations are smaller at the connection point than at the voltage busbar.

BRIEF DESCRIPTION OF THE FIGURES

Some embodiments of the invention will be described in more detail in the attached drawings, in which.

In the figures, some embodiments of the invention are shown simplified for the sake of clarity. Similar parts are marked with the same reference numbers in the figures.

DETAILED DESCRIPTION OF THE INVENTION

Figure 2:
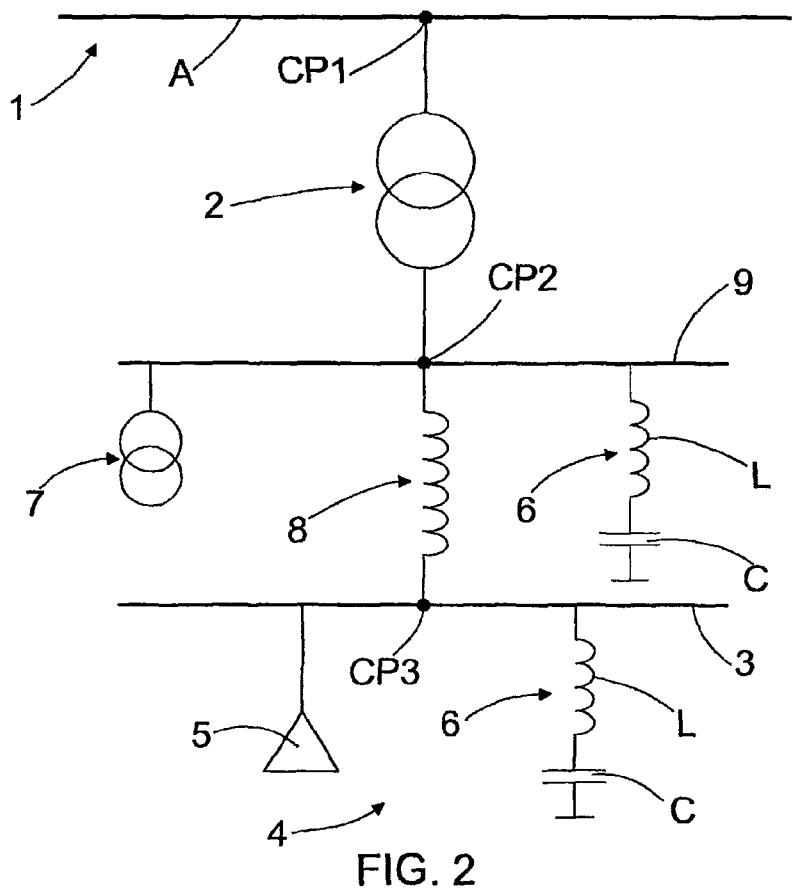
FIG. 2 shows an arrangement of the invention for reactive power compensation in connection with a power transmission line schematically.

FIG. 2 shows an arrangement of the invention for reactive power compensation in connection with a power transmission line 1 schematically. For the sake of clarity, FIG. 2 shows only one phase, such as phase A, of the power transmission line 1. The power transmission line 1 may be, for instance, a power transmission line 1 of a high-voltage network, and the voltage level of the power transmission line 1 in Finland, for example, may typically be 110 kV, 220 kV or 400 kV, for instance.

Figure 1:
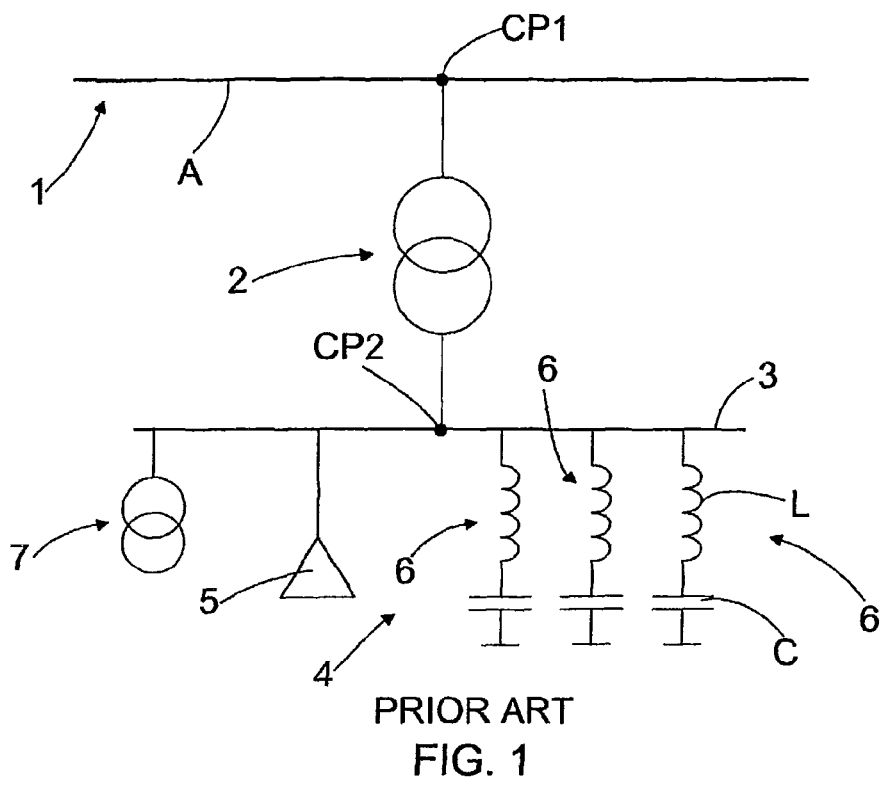
FIG. 1 shows a prior art arrangement for reactive power compensation in connection with a power transmission line schematically.

FIG. 2 also shows a transformer 2 or a main transformer 2, via which the voltage level of the power transmission line 1 can be reduced from a high voltage to a medium voltage, for instance, the voltage level of the medium voltage typically being, for instance, 20 kV in Finland. On the high-voltage or primary side, the transformer 2 is connected to the power transmission line 1 by a schematically shown connection at a connection point CP1. The arrangement of FIG. 1 further comprises an adapter reactor 8 or a compensator reactor 8 or a reactor 8 connected to the low-voltage or secondary side of the transformer 2 and comprising a coil, in other words, the low-voltage side of the transformer 2 is connected to the first terminal of the adapter reactor 8 by a schematically shown connection at a connection point CP2, which means that the transformer 2 and the adapter reactor 8 are connected in series with one another. At a connection point CP3, the second terminal of the adapter reactor 8 is connected to a voltage busbar 3, of which only one phase, i.e. phase A, is shown schematically in FIG. 2. The voltage busbar 3 is connected with a reactive power compensator 4, i.e. a static compensator, which, in the embodiment shown in FIG. 1, comprises a thyristor-controlled reactor (TCR) 5 shown schematically by a triangular symbol and a harmonic filter 6, the structures of which are similar to those described in connection with FIG. 1. The reactive power compensator 4 is thus connected to the power transmission line 1 via the series connection of the transformer 2 and the adapter reactor 8.

In the embodiment shown in FIG. 2, the adapter reactor 8 is located on the low-voltage side of the transformer 2 between the transformer 2 and the reactive power compensator 4. Alternatively, the adapter reactor 8 could be connected in series with the transformer 2 by placing the adapter reactor 8 to the high-voltage side of the transformer 2 between the transformer 2 and the power transmission line 1.

By using the adapter reactor 8 connected in series with the transformer 2, a significant additional impedance can be provided in order to compensate for reactive power that is effective at the voltage busbar 3. Depending on the application or the compensation need, impedance of the adapter reactor 8 may be of many different magnitudes but, preferably, the impedance of the adapter reactor 8 is set to at least 25% of the impedance of the transformer 2. The use of the adapter reactor 8 connected in series with the transformer 2 in the above manner provides a plurality of significant advantages.

For example, the adapter reactor 8 improves the behaviour of the electric network with respect to harmonic components. Since the impedance of the adapter reactor 8 increases as a function of frequency, the adapter reactor 8 efficiently prevents the harmonic components of current from passing to the power transmission line 1, thus improving the behaviour of the entire interconnected electric network and the quality of electricity.

Furthermore, since the adapter reactor 8 prevents the harmonic components of current from passing to the power transmission line 1, the number of harmonic filters 6 belonging to the reactive power compensator 4 connected to the voltage busbar 3 may be reduced to the extent that the reactive power compensator 4 comprises only one harmonic filter 6, as shown schematically in FIG. 2. This reduces the number of components required for the structure of the reactive power compensator 4, thus reducing both the costs of the reactive power compensator 4 itself and the amount of installation work at the installation site thereof.

According to an embodiment, either one or more harmonic filters 6 used for filtering harmonic components may be connected in parallel with the adapter reactor 8 in the connection between the transformer 2 and the adapter reactor 8. This is schematically shown in FIG. 2, which shows a second voltage busbar 9 placed between the transformer 2 and the adapter reactor 8, to which voltage busbar 9 the low-voltage side of the transformer 2 and the first terminal of the adapter reactor 8 are connected at the above-mentioned connection point CP2, the voltage busbar 9 being also connected with one harmonic filter 6 in the embodiment of FIG. 2. The harmonic filter 6 at said location further improves the filtering of the harmonic components in the system.

The adapter reactor 8 causes a big voltage change at the voltage busbar 3 when the output of the reactive power compensator 4 changes from the highest capacitive output, when the voltage at the voltage busbar 3 is high, to the highest inductive output, when the voltage at the voltage busbar 3 is low. Voltage effective over the thyristor at the triggering moment is obtained by multiplying the voltage of the voltage busbar 3 by the sine of the trigger angle. When the secondary voltage is highest, the sine of the trigger angle is smallest. When proceeding from the maximum capacitive extreme to the inductive direction, the sine of the trigger angle starts to increase considerably but the voltage of the voltage busbar 3 starts to decrease considerably. Compared to the prior art arrangement (FIG. 1), the maximum value for the product of the voltage and the sine of the angle thus remains considerably lower. Due to this, the number of thyristor levels belonging to the thyristor control of the thyristor-controlled reactor 5 may be reduced, which reduces losses, cooling demand and costs of the thyristor-controlled reactor 5 and increases the reliability of the thyristor-controlled reactor 5.

Due to the adapter reactor 8, it is also possible to decrease the size or power of the coil of the thyristor-controlled reactor 5. As a result, the losses of the reactive power compensator 4 with respect to the operating point may be reduced, because at the zero output point of the reactive power compensator 4, which is usually the most loaded operating point of the reactive power compensator 4, the operation of the reactive power compensator 4 consumes current to some extent, but the current of the adapter reactor 8 is zero.

The adapter reactor 8 also decreases the current of the thyristor-controlled reactor 5. Great voltage variation at the voltage busbar 3 diminishes the capacitive power of the harmonic filters 6 of the reactive power compensator 4 efficiently when the output of the reactive power compensator 4 approaches the inductive end of the operating range. This decreases the required current of the thyristor-controlled reactor 5 at the highest inductive output. In other words, as a result, the harmonic filters 6 operate similarly as the thyristor-connected capacitor batteries, whereby their power at the highest capacitive operating point is 3 to 5 times higher than at the highest inductive operating point.

The adapter reactor 8 also limits the short-circuit power of the voltage busbar 3, simultaneously reducing the short-circuit power required from the apparatuses connected to the voltage busbar 3.

What all the above-mentioned advantages have, in one way or another, in common is that by adding to the system an adapter reactor 8 connected in series with the transformer 2 in the above manner, it is possible to reduce the number of components required in the reactive power compensator 4, which reduces losses in the reactive power compensator 4 and the amount of installation work required for installing the reactive power compensator 4. Cost savings resulting from these advantages are in practice so big that their significance is many times higher than that of the extra costs caused by the adapter reactor.

According to an embodiment, one or more auxiliary transformers 7 may be connected in parallel with the adapter reactor 8 in the connection between the transformer 2 and the adapter reactor 8. This is shown schematically in FIG. 2, in which the auxiliary transformer 7 is connected to the second voltage busbar 9. Due to the adapter reactor 8, potential variation of the voltage effective at this connection point is very small, and the voltage of auxiliary electric power possibly needed for using the substation devices remains more stable and does not cause disturbance in the operation of the devices.

In some cases, the features described in this application may be used as such, regardless of other features. On the other hand, the features described in this application may also be combined to provide various combinations as necessary.

The drawings and the related description are only intended to illustrate the idea of the invention. The invention may vary in its details within the scope of the claims.

The invention claimed is:

1. An arrangement for reactive power compensation in connection with a power transmission line, the arrangement comprising:
   at least one transformer,
   at least one first voltage busbar on a low voltage side of the transformer,
   at least one second voltage busbar on the low voltage side of the transformer between the transformer and the first voltage bus bar,
   at least one reactive power compensator connected to the first voltage busbar on the low-voltage side of the transformer, the reactive power compensator comprising at least one thyristor-controlled reactor, and
   at least one adapter reactor, which is connected to the first voltage busbar and the second voltage busbar between the first voltage busbar and the second voltage busbar, on the low-voltage side of the transformer and in series with the transformer so that the reactive power compensator is connected to the power transmission line via the transformer and the adapter reactor,
   wherein the reactive power compensator comprises at least one harmonic filter connected to the first voltage busbar in parallel with the thyristor-controlled reactor, and
   wherein at least one harmonic filter is connected to the second voltage busbar in parallel with the adapter reactor in the connection between the transformer and the adapter reactor.

2. The arrangement as claimed in claim 1, wherein at least one auxiliary transformer is connected to the second voltage busbar in parallel with the adapter reactor in the connection between the transformer and the adapter reactor.

3. The arrangement as claimed in claim 1, wherein the impedance of the adapter reactor is at least 25% of the impedance of the transformer.

4. A method for reactive power compensation in connection with a power transmission line, the method comprising
   compensating for reactive power by means of a reactive power compensator connected to a first voltage busbar on a low-voltage side of at least one transformer, the reactive power compensator comprising at least one thyristor-controlled reactor, and
   connecting at least one adapter reactor to the low-voltage side of the transformer,
   wherein the adapter reactor is connected to a first voltage busbar and a second voltage busbar, between the first voltage busbar and the second voltage busbar and in series with the transformer so that the reactive power compensator is connected to the power transmission line via the transformer and the adapter reactor,
   wherein the reactive power compensator comprises at least one harmonic filter to be connected to the first voltage busbar in parallel with the thyristor-controlled reactor, and
   wherein at least one harmonic filter is connected to the second voltage busbar in parallel with the adapter reactor in the connection between the transformer and the adapter reactor.

5. The method as claimed in claim 4, wherein at least one auxiliary transformer is connected to the second voltage busbar in parallel with the adapter reactor in the connection between the transformer and the adapter reactor.

6. The method as claimed in claim 4, wherein the impedance of the adapter reactor is set to at least 25% of the impedance of the transformer.

* * * * *